(12) United States Patent
Kim et al.

(10) Patent No.: US 9,726,924 B2
(45) Date of Patent: Aug. 8, 2017

(54) DISPLAY DEVICE AND MANUFACTURING METHOD THEREOF

(71) Applicant: Samsung Display Co., Ltd., Yongin-si (KR)

(72) Inventors: Jin Hwan Kim, Seoul (KR); Joo-Han Bae, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 21 days.

(21) Appl. No.: 14/881,586

(22) Filed: Oct. 13, 2015

(65) Prior Publication Data

US 2016/0209688 A1    Jul. 21, 2016

(30) Foreign Application Priority Data

Jan. 21, 2015    (KR) .................. 10-2015-0010082

(51) Int. Cl.

| | |
|---|---|
| *G02F 1/13* | (2006.01) |
| *G02F 1/1333* | (2006.01) |
| *G06F 3/041* | (2006.01) |
| *G06F 3/044* | (2006.01) |
| *G02F 1/1343* | (2006.01) |
| *G02F 1/1362* | (2006.01) |

(52) U.S. Cl.
CPC .... *G02F 1/13338* (2013.01); *G02F 1/133377* (2013.01); *G06F 3/044* (2013.01); *G06F 3/0412* (2013.01); *G02F 1/134363* (2013.01); *G02F 1/136209* (2013.01); *G06F 2203/04103* (2013.01)

(58) Field of Classification Search
CPC ...................... G02F 1/133377; G02F 1/13338
See application file for complete search history.

(56) References Cited

U.S. PATENT DOCUMENTS 8,629,842 B2    1/2014  Jang
9,366,897 B2 *  6/2016  Choi ................. G02F 1/13338
(Continued)

FOREIGN PATENT DOCUMENTS

KR    1020100061121    6/2010
KR    101084169        11/2011
(Continued)

*Primary Examiner* — Mariceli Santiago
(74) *Attorney, Agent, or Firm* — H.C. Park & Associates, PLC

(57) ABSTRACT

An exemplary embodiment discloses a display device including: a substrate including at least one of pixels; a thin film transistor disposed on the substrate; a common electrode disposed on the thin film transistor; a pixel electrode disposed on the common electrode overlapping the common electrode; an insulating layer interposed between the common electrode and the pixel electrode; at least one roof layer disposed spaced apart from the common electrode and the pixel electrode to form a microcavity therebetween, the microcavity including an injection hole; a liquid crystal layer disposed in the microcavity; at least two adjacent first touch sensing electrode disposed on the at least one roof layer; an auxiliary electrode disposed between the two adjacent first touch sensing electrodes; an overcoat disposed to cover the first touch sensing electrodes and the injection hole, the overcoat sealing the microcavity; and a second touch sensing electrode disposed on the overcoat.

16 Claims, 12 Drawing Sheets

(56) References Cited

U.S. PATENT DOCUMENTS

| | | | |
|---|---|---|---|
| 9,417,474 B2* | 8/2016 | Choi | G02F 1/13338 |
| 9,519,173 B2* | 12/2016 | Jung | G02F 1/133377 |
| 2010/0134426 A1 | 6/2010 | Lee et al. | |
| 2014/0028925 A1* | 1/2014 | Choi | G02F 1/13338 |
| | | | 349/12 |
| 2014/0111471 A1 | 4/2014 | Zhao | |

FOREIGN PATENT DOCUMENTS

| | | |
|---|---|---|
| KR | 1020140000590 | 1/2014 |
| KR | 1020140006576 | 1/2014 |
| KR | 1020140016593 | 2/2014 |
| KR | 1020140032344 | 3/2014 |

* cited by examiner

DISPLAY DEVICE AND MANUFACTURING METHOD THEREOF

CROSS-REFERENCE TO RELATED APPLICATION

This application claims priority from and the benefit of Korean Patent Application No. 10-2015-0010082 filed on Jan. 21, 2015, which is hereby incorporated by reference for all purposes as if fully set forth herein.

BACKGROUND

Field

Exemplary embodiments relate to a display device and a manufacturing method thereof. More particularly, the exemplary embodiments relate to a display device formed with a touch electrode and an auxiliary electrode on its top surface, and a manufacturing method thereof.

Discussion of the Background

As one of the most widely used flat panel displays at present, a liquid crystal display (LCD) includes two display panels on which electric field generating electrodes including a pixel electrode and a common electrode are formed, and a liquid crystal layer interposed between the two display panels. The LCD generates an electric field on a liquid crystal layer by applying a voltage to the electric field generating electrodes, determines alignment directions of liquid crystal molecules of the liquid crystal layer through the generated field, and controls polarization of incident light, thereby displaying an image.

Two sheets of display panels of which the LCD consists may include a thin film transistor array panel and an opposing display panel. In the thin film transistor array panel, a gate line for transmitting a gate signal and a data line for transmitting a data signal are formed to cross each other, and a thin film transistor coupled to the gate line and the data line, a pixel electrode coupled to the thin film transistor, and the like may be formed. In the opposing display panel, a light blocking member, a color filter, a common electrode, and the like may be formed. If necessary, the light blocking member, the color filter, and the common electrode may be formed on the thin film transistor array panel.

Conventional liquid crystal displays include two substrates respectively including elements separately on the two substrates, and therefore requires longer processing time, and the display device may be relatively heavy, thick, and expensive.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments discloses a display device and a manufacturing method thereof that may reduce weight, thickness, cost, and processing time by manufacturing the display device using one substrate.

Additional aspects will be set forth in the detailed description which follows, and, in part, will be apparent from the disclosure, or may be learned by practice of the inventive concept.

An exemplary embodiment discloses a display device including: a substrate including at least one of pixels; a thin film transistor disposed on the substrate; a common electrode disposed on the thin film transistor; a pixel electrode disposed on the common electrode overlapping the common electrode; an insulating layer interposed between the common electrode and the pixel electrode; at least one roof layer disposed spaced apart from the common electrode and the pixel electrode to form a microcavity therebetween, the microcavity including an injection hole; a liquid crystal layer disposed in the microcavity; at least two adjacent first touch sensing electrode disposed on the at least one roof layer; an auxiliary electrode disposed between the two adjacent first touch sensing electrodes; an overcoat disposed to cover the first touch sensing electrodes and the injection hole, the overcoat sealing the microcavity; and a second touch sensing electrode disposed on the overcoat.

An exemplary embodiment discloses a manufacturing method of a display device, including: disposing a thin film transistor on a substrate; disposing a common electrode on the thin film transistor; disposing an insulating layer on the common electrode; disposing a pixel electrode overlapping the common electrode, the pixel electrode connected to the thin film transistor; disposing a sacrificial layer on the pixel electrode; forming a roof layer including: coating an organic material on the sacrificial layer; and patterning the organic material to expose the sacrificial layer through the patterned roof layer; removing the exposed sacrificial layer to form a microcavity and an injection hole between the roof layer and the pixel electrode; simultaneously disposing a first touch sensing electrode on the roof layer and an auxiliary electrode between the two adjacent first touch sensing electrodes; injecting a liquid crystal material into the microcavity through the injection hole; sealing the microcavity by forming an overcoat on the first touch sensing electrode and the auxiliary electrode; and forming a second touch sensing electrode on the overcoat.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
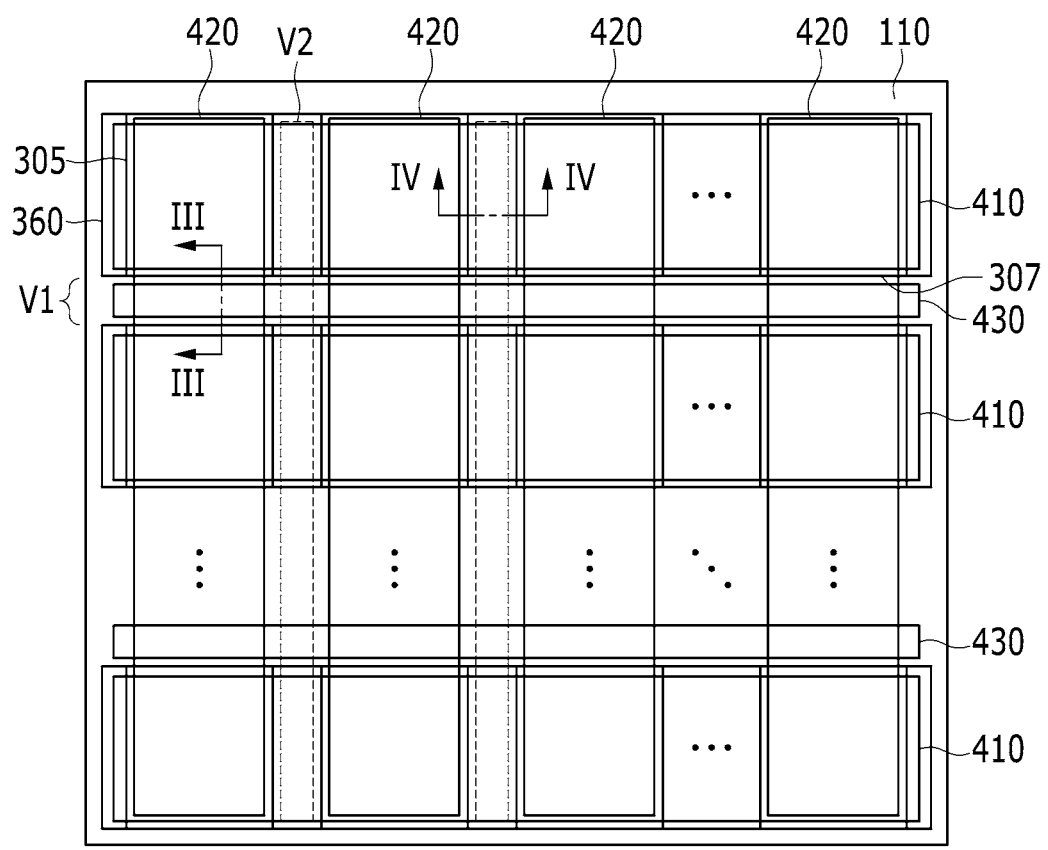
FIG. 1 is a plan view of a display device according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view of a display device according to an exemplary embodiment.

Referring to FIG. 1, the display device according to an exemplary embodiment includes a substrate 110 made of a material such as glass or plastic.

Microcavities 305 covered by a roof layer 360 are formed on the substrate 110. The roof layer 360 is disposed extending in a row direction, and a plurality of microcavities 305 are formed under the roof layer 360.

The microcavities 305 may be arranged in a matrix form. A first valley V1 is disposed between the microcavities 305 that are adjacent in a column direction, and a second valley V2 is disposed between the microcavities 305 that are adjacent in a row direction.

The plurality of roof layers 360 are separated from each other by the interposing first valley V1. The roof layer 360 covers the microcavity 305 except for a first side edge contacting the first valley V1, where the microcavity 305 is exposed. The first side edge of the microcavity 305 that is not covered by the roof layer 360 is referred to as an injection hole 307. The injection hole 307 is formed at one side edge of the microcavity 305.

Each roof layer 360 is separated from the substrate 110 between the adjacent second valleys V2, thereby forming the microcavity 305. The roof layer 360 covers all side edges of the microcavity 305 except for the first side edge where the injection hole 307 is formed. Thus, the roof layer 360 includes three side walls covering three side edges excluding the first side edge and a top side. The side wall facing the injection hole 307 may be a horizontal support member, and the side walls coupled to the horizontal supporting member may be a vertical support member.

First touch sensing electrodes 410 are disposed on the roof layers 360 in the row direction along which the roof layer 360 is formed, and second touch sensing electrodes 420 are disposed on the roof layers 360 in the column direction along which the microcavity 305 is formed. The first touch sensing electrode 410 integrally formed with the roof layer 360 along the row direction may be disposed under the second touch sensing electrode 420 that is formed in the column direction along which the microcavities 305 are formed. However, exemplary embodiments are not limited thereto.

The first touch sensing electrode 410 and the second touch sensing electrode 420 may be configured to sense a contact of an object approaching or contacting the display device. The contact may include a direct touch in response to an external object such as a user's finger directly touching the display device, as well as a hovering touch in response to an external object approaching the display device or hovering while approaching the display device. The first and second touch sensing electrodes 410 and 420 may be configured to convert a pressure applied to a specific point or capacitance variation generated at a specific location into an electrical input signal.

A plurality of signal wires extending from the first and second touch sensing electrodes 410 and 420 may be disposed outside of the display device for signal transmission, and the signal wires may be coupled to a sensing signal controller (not shown) for controlling the first and second touch sensing electrodes 410 and 420 by transmitting and receiving a sensing input signal or sensing output signal thereto. The plurality of signal wires may be integrally formed with the first and second touch sensing electrodes 410 and 420.

According to one or more exemplary embodiments, the first and second touch sensing electrodes 410 and 420 may be arranged in each row direction and each column direction along which the roof layers 360 and the microcavities 305 are respectively formed. In other words, the first touch sensing electrodes 410 are not formed in the first valley V1 but are formed in each pixel (or each pixel area) PX and the second valley V2 along a pixel row, and the second touch sensing electrodes 420 are not formed in the second valley V2 but are formed in each pixel PX and first valley V1 along a pixel column.

The first and second touch sensing electrodes 410 and 420 may sense contacts in various ways. For example, the first and second touch sensing electrodes 410 and 420 may be various types, such as a resistive type, a capacitive type, an electro-magnetic type (EM), an optical type, etc. The exemplary embodiments will be described a capacitive type touch sensing electrode as an example.

Auxiliary electrodes 430 may be further disposed between the adjacent first touch sensing electrodes 410 that are formed along the pixel rows.

The auxiliary electrodes 430 may be formed parallel to the first touch sensing electrodes 410 along the first valley V1 in which the first touch sensing electrodes 410 are not formed.

The auxiliary electrodes 430 may be integrally formed of a same material as the first touch sensing electrodes 410, and the auxiliary electrodes 430 may reduce or prevent display abnormalities such as abnormal movement of liquid crystals caused by a static electricity that may occur inside and outside the display device. The auxiliary electrodes 430 may be formed of at least one of a silver nanowire (AgNW), ITO, IZO, carbon nanotubes (CNT), graphene, a metal mesh, a conductive polymer, etc.

The display device according to the exemplary embodiments is not limited to the above exemplary illustrations, and may be modified in various ways. For example, arrangement of the microcavity 305, the first valley V1, and the second valley V2 may be modified, a plurality of roof layers 360 may be coupled to each other in the first valley V1, and each roof layer 360 may be separated from the substrate 110 in the second valley V2 such that the adjacent microcavities 305 may be coupled to each other.

The display device according to an exemplary embodiment will now be described with reference to FIGS. 2, 3, and 4.

Figure 2:
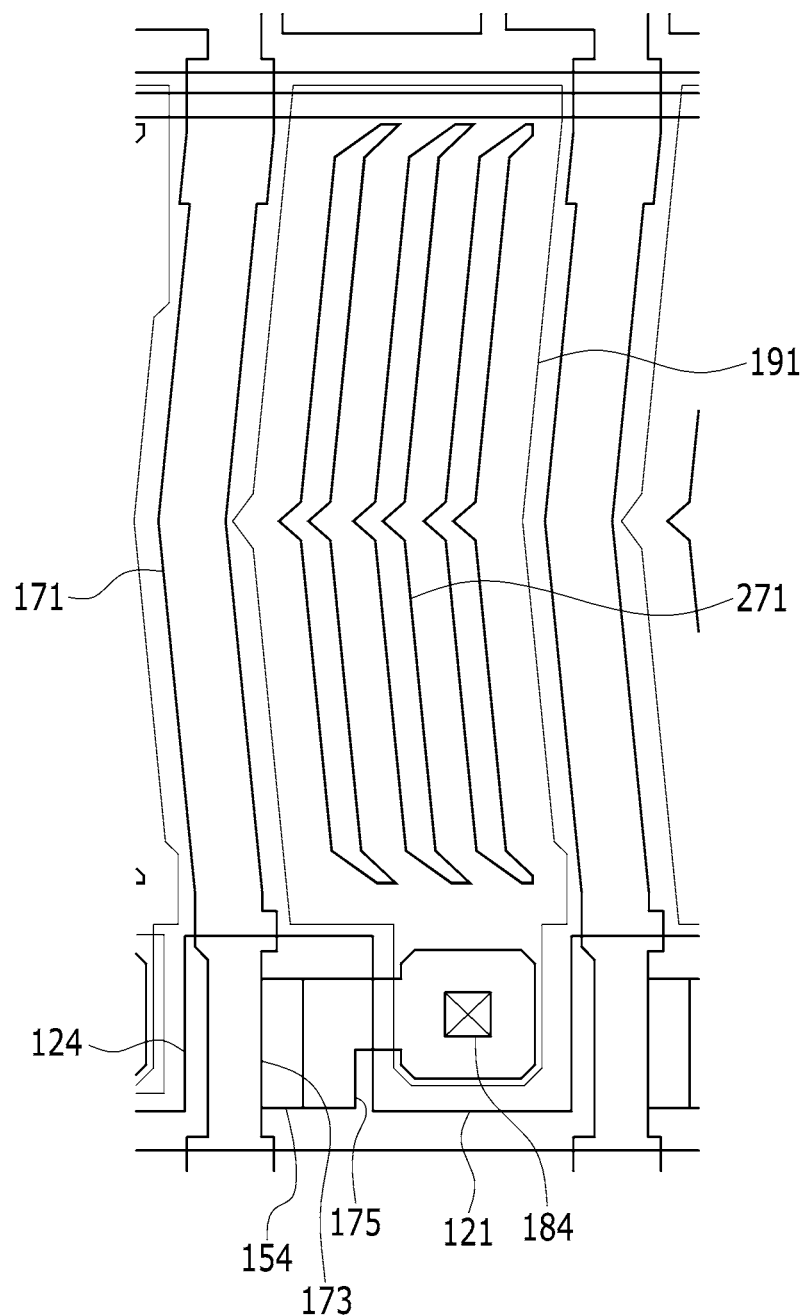
FIG. 2 is a plan view of one pixel of the display device according to the exemplary embodiments.

FIG. 2 is a plan view of one pixel of the display device according to an exemplary embodiment. FIG. 3 is a cross-sectional view taken along sectional line III-III of FIG. 1. FIG. 4 is a cross-sectional view taken along sectional line IV-IV of FIG. 1, according to an exemplary embodiment.

A gate conductor including a gate line 121 is disposed on the substrate 110 that is formed of transparent glass or plastic.

The gate line 121 includes a wide end portion for connection with a gate electrode 124 and other layers and/or an external driving circuit (not shown). The gate line 121 may be formed of an aluminum-based metal such as aluminum (Al) and/or an aluminum alloy, a silver-based metal such as silver (Ag) and/or a silver alloy, a copper-based metal such as copper (Cu) and/or a copper alloy, a molybdenum-based metal such as molybdenum (Mo) and/or a molybdenum alloy, chromium (Cr), tantalum (Ta), titanium (Ti), etc. However, the gate line 121 may have a multilayer structure including at least two conductive layers having different physical properties.

A gate insulating layer 140 formed of a silicon nitride ($SiN_x$) and/or a silicon oxide ($SiO_x$) is disposed on the gate conductor 121. The gate insulating layer 140 may have a multilayer structure in which at least two insulating layers having different physical properties are included.

A semiconductor 154 formed of amorphous silicon and/or polysilicon is disposed on the gate insulating layer 140. The semiconductor 154 may include an oxide semiconductor.

Ohmic contacts (not shown) are disposed on the semiconductor 154. The ohmic contacts may be formed of a material such as n+ hydrogenated amorphous silicon highly doped with an n-type impurity such as phosphorus, and/or a silicide. The ohmic contacts may be disposed in pairs on the semiconductor 154. The ohmic contacts may be omitted if the semiconductor 154 is the oxide semiconductor.

A data line 171 including a source electrode 173 and a data conductor including a drain electrode 175 are disposed on the semiconductor 154 and the gate insulating layer 140.

The data line 171 includes a wide end portion for connection with another layer and/or the external driving circuit (not shown). The data line 171 transmits a data signal and mainly extends in a vertical direction to cross the gate line 121.

The data line 171 may include a first curved portion having a curved shape to increase the transmittance of the liquid crystal display, and parts of the curved portion may meet each other in a center region of the pixel area to form a V shape. A second curved portion may be further included in the center region of the pixel area such that it is curved to form a predetermined angle with the first curved portion.

The first curved portion of the data line 171 may be curved at an angle of about 7° with a vertical reference line which is disposed at an angle of 90° with the gate line 121. The second curved portion may be curved at an angle of about 7° to about 15° with the first curved portion.

The source electrode 173 is a part of the data line 171 and is disposed co-linear with the data line 171. The drain electrode 175 is formed to extend in parallel with the source electrode 173. Thus, the drain electrode 175 is disposed in parallel with the part of the data line 171.

The gate electrode 124, the source electrode 173, the drain electrode 175, and the semiconductor 154 form one thin film transistor (TFT), and a channel of the thin film transistor is formed in the semiconductor 154 between the source electrode 173 and the drain electrode 175.

By including the source electrode 173 disposed co-linear with the data line 171 and the drain electrode 175 extending in parallel with the data line 171, the display device according to the exemplary embodiments may increase a width of the thin film transistor without increasing an area taken up by the data conductor, thereby increasing the aperture ratio of the display device. However, a display device according to exemplary embodiments is not limited thereto, and it's the source and drain electrodes 173 and 175 may have different shapes.

The data line 171 and the drain electrode 175 may be formed of a refractory metal including at least one of molybdenum, chromium, tantalum, titanium, etc., and an alloy thereof. The data line 171 and the drain electrode 175 may have a multilayer structure including a refractory metal layer (not shown) and a low-resistance conductive layer (not shown). For example, the multilayer structure may be a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, exemplary embodiments are not limited thereto, and the data line 171 and the drain electrode 175 may be made of various metals and/or conductors.

A passivation layer 180 is disposed on the data conductors 171, 173, and 175, the gate insulating layer 140, and an exposed portion of the semiconductor 154. The passivation layer 180 may be made of an organic insulating material, an inorganic insulating material, or the like.

A color filter 230 is disposed in each pixel area PX on the passivation layer 180. Each color filter 230 may display one of the primary colors, such as three primary colors of red, green, and blue. The exemplary embodiments are not limited thereto, and the color filter 230 may display cyan, magenta, yellow, and white-based colors. The color filter 230 may extend in the column direction along between the adjacent data lines 171.

An organic layer 240 is disposed on the color filter 230. The organic layer 240 has a thickness greater than that of the passivation layer 180, and may have a smooth surface.

The organic layer 240 may be disposed in a display area where a plurality of pixels are disposed, and may not be disposed in a peripheral area where a gate pad portion and/or data pad portion is formed. The organic layer 240 may also be disposed in the peripheral area where the gate pad portion and/or data pad portion is formed.

A contact hole 184 is disposed in the organic layer 240, the color filter 230, and the passivation layer 180.

A common electrode 270 is disposed on the organic layer 240. The common electrode 270 may have a planar shape, and may be disposed in the display area where the plurality of pixels are disposed but not in the peripheral area where the gate pad portion and/or data pad portion are disposed.

The common electrode 270 is formed of a transparent conductive layer including at least one of indium tin oxide (ITO) and indium zinc oxide (IZO).

An insulating layer 250 is disposed on the common electrode 270. The insulating layer 250 may be formed of an inorganic insulating material including at least one of a silicon nitride ($SiN_X$), a silicon oxide ($SiO_X$), a silicon oxynitride ($SiO_XN_Y$), etc. The insulating layer 250 may protect the color filter 230 made of the organic material and insulate the common electrode 270 from the pixel electrode 191. That is, even if the common electrode 270 is disposed to overlap the pixel electrode 191, the common electrode 270 and the pixel electrode 191 may be restrained or prevented from being short-circuited because the insulating layer 250 is disposed on the common electrode 270.

The pixel electrode 191 is disposed on the insulating layer 250. The pixel electrode 191 includes a curved edge that is disposed substantially in parallel with the first and second curved portions of the data line 171. The pixel electrode 191 may be formed of a transparent conductive layer including at least one of ITO and IZO.

The pixel electrode 191 is physically and electrically connected to the drain electrode 175 through the contact hole 184 formed in the organic layer 240, the color filter 230, and the passivation layer 180, and is applied with a data voltage from the drain electrode 175.

The pixel electrode 191 is applied with the data voltage from the drain electrode 175, and the common electrode 270 is applied with a reference voltage from a reference voltage applying unit (not shown) that is disposed outside of the display area.

The pixel electrode 191 and the common electrode 270 generate an electric field according to the voltages respectively applied thereto, and liquid crystal molecules 310 of a liquid crystal layer over the pixel and common electrodes 191 and 270 are aligned in a direction parallel to a direction of the electric field. Polarization of light passing through the liquid crystal layer may be controlled depending on the alignment directions of the liquid crystal molecules 310.

A lower insulating layer 350 may be further disposed on the pixel electrode 191 distant from the pixel electrode 191. The lower insulating layer 350 may be made of an inorganic insulating material including at least one of a silicon nitride ($SiN_X$), a silicon oxide ($SiO_X$), etc.

The microcavity 305 is formed between the pixel electrode 191 and the lower insulating layer 350. In other words, the microcavity 305 is enclosed by the pixel electrode 191 and the lower insulating layer 350. Widths and sizes of the microcavity 305 may be variously modified depending on sizes and resolutions of the display devices.

A first alignment layer 11 is formed on the pixel electrode 191. The first alignment layer 11 may be formed directly on the lower insulating layer 350 not covered by the pixel electrode 191. A second alignment layer 21 is formed under the lower insulating layer 350 facing the first alignment layer 11.

The first alignment layer 11 and the second alignment layer 21 may be formed as vertical alignment layers, and may be made of an aligning material including at least one of polyamic acid, polysiloxane, polyimide, etc. The first and second alignment layers 11 and 21 may be coupled to each other at an edge of the pixel as illustrated in FIG. 4.

The liquid crystal layer including the liquid crystal molecules 310 is disposed in the microcavity 305 that is disposed between the pixel electrode 191 and the lower insulating layer 350.

A light blocking member 220 is disposed in a region between adjacent color filters 230. Referring to FIG. 3, the light blocking member 220 may be disposed on the pixel electrode 191 and the insulating layer 250 that is not covered by the pixel electrode 191. The light blocking member 220 is disposed on a boundary of the pixel PX and the thin film transistor to reduce or prevent light leakage.

The light blocking member 220 is disposed extending along the gate line 121. The light blocking member 220 may include a horizontal light blocking member disposed covering the thin film transistor and the like, and a vertical light blocking member disposed extending along the data line 171. In other words, the horizontal light blocking member may be disposed in the first valley V1, and the vertical light blocking member may be disposed in the second valley V2. The color filter 230 and the light blocking member 220 may overlap each other in some regions.

An auxiliary electrode 430 may be disposed in the first valley V1 corresponding to the light blocking member 220.

The auxiliary electrode 430 may be disposed parallel to the first touch sensing electrode 410 along the first valley V1, in which the first touch sensing electrode 410 is not formed.

The auxiliary electrode 430 may be formed of the same material as the first touch sensing electrode 410, and the auxiliary electrodes 430 may reduce or prevent display abnormalities such as abnormal movement of liquid crystals caused by the static electricity that may occur inside and outside the display device.

The auxiliary electrode 430 may be made of at least one of a silver nanowire (AgNW), ITO, IZO, carbon nanotubes (CNT), graphene, a metal mesh, a conductive polymer, etc.

The roof layer 360 is disposed on the lower insulating layer 350. The roof layer 360 may be formed of an organic material. The microcavity 305 is disposed under the roof layer 360. The roof layer 360 may be hardened by a hardening process to maintain a shape of the microcavity 305. The roof layer 360 is disposed spaced apart from the pixel electrode 191 interposing the microcavity 305 therebetween.

The roof layer 360 is disposed in each pixel PX and the second valley V2 along the pixel row, but the roof layer 360 is not disposed in the first valley V1. In the second valley V2, the microcavity 305 is not disposed under the roof layer 360. Thus, a thickness of the roof layer 360 positioned in the second valley V2 may be formed greater than that of the roof layer 360 disposed in the pixel area, and the thicker region may be referred to as a vertical support member. The microcavity 305 is formed such that its top and side edges are covered by the roof layer 360.

The injection hole 307 is formed in the roof layer 360 to partially expose the microcavity 305. The lower insulating layer 350 adjacent to the injection hole 307 may include a region that protrudes further than the roof layer 360.

The injection hole 307 may be disposed in at least one or more side edges of the pixel area PX, and the microcavity 305 is exposed by the injection hole 307. Therefore, an aligning agent or a liquid crystal material may be injected into the microcavity 305 through the injection hole 307.

An intermediate insulating layer 370 may be disposed on the roof layer 360. The intermediate insulating layer 370 may be made of an inorganic insulating material including at least one of a silicon nitride ($SiN_x$), a silicon oxide ($SiO_x$), etc. The intermediate insulating layer 370 may be disposed covering the top and lateral side edges of the roof layer 360. The intermediate insulating layer 370 may protect the roof layer 360 that is formed of an organic material. The intermediate insulating layer 370 may be omitted.

Figure 3:
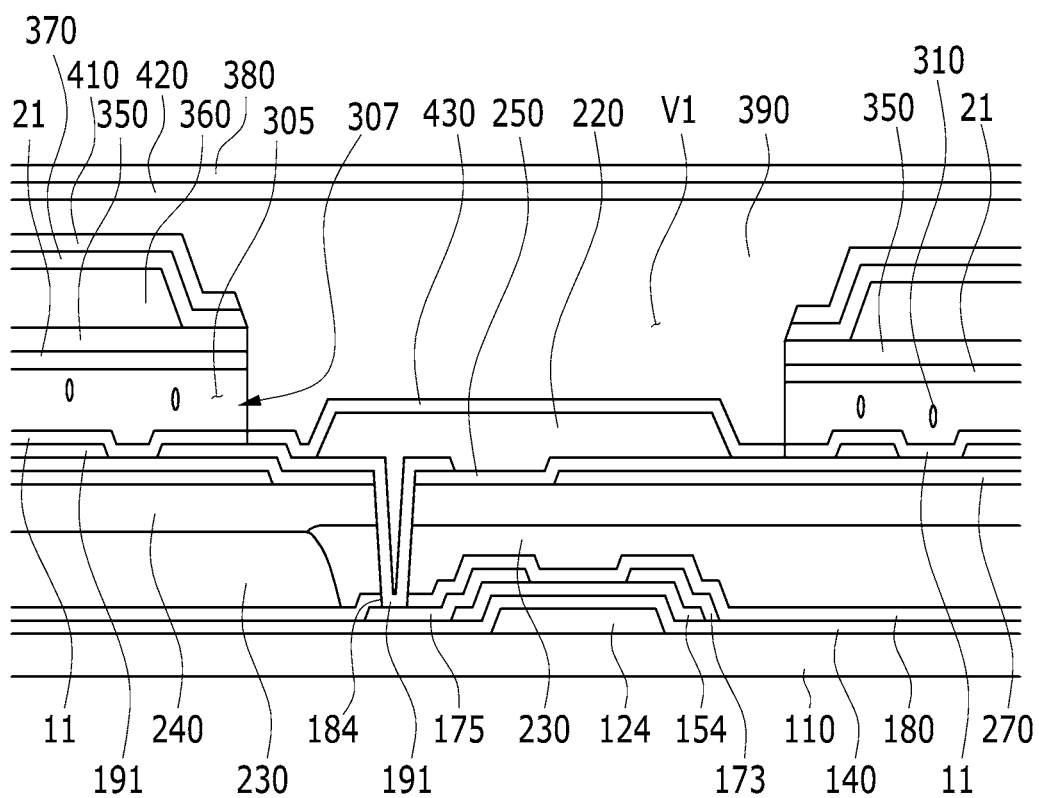
FIG. 3 is a cross-sectional view taken along sectional line III-III of FIG. 1, according to one or more exemplary embodiments.
Figure 4:
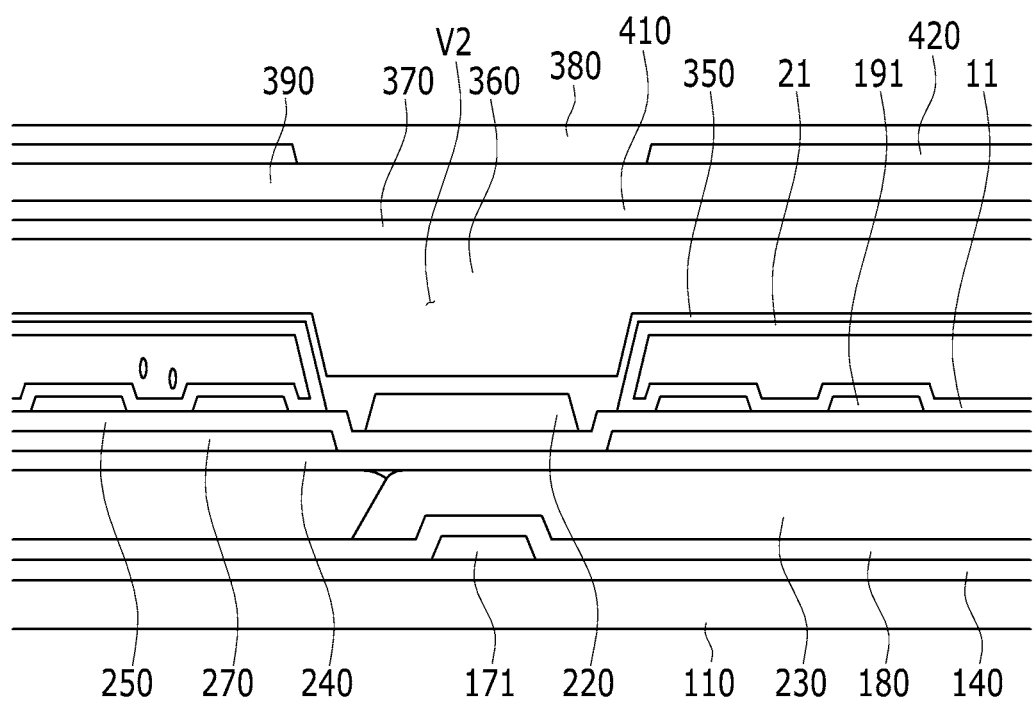
FIG. 4 is a cross-sectional view taken along sectional line IV-IV of FIG. 1, according to one or more exemplary embodiments.

Referring to FIG. 3, the intermediate insulating layer 370 may contact the region of the lower insulating layer 350 that protrudes further than the roof layer 360 adjacent to the injection hole 307. Further, the intermediate insulating layer 370 may have a step cross-section due to a step difference between a region of the intermediate insulating layer 370 directly contacting the lower insulating layer 350 and a region of the intermediate insulating layer 370 disposed covering the roof layer 360.

The intermediate insulating layer 370 may be coupled to the lower insulating layer 350.

The first touch sensing electrode 410 may be disposed on the intermediate insulating layer 370.

In the display device according to the exemplary embodiments, the first touch sensing electrode 410 may be arranged in the row direction along which the roof layer 360 is formed. In other words, the first touch sensing electrode 410 is disposed in each pixel PX and the second valley V2 along the pixel row, and is not disposed in the first valley V1.

Accordingly, the first touch sensing electrode 410 may be disposed on top surface of the intermediate insulating layer 370. The first touch sensing electrode 410 may include at least one of a silver nanowire (AgNW), ITO, IZO, CNT, graphene, a metal mesh, and a conductive polymer.

The first touch sensing electrode 410 receives the sensing input signal from the sensing signal controller (not shown) and transmits the sensing output signal. The sensing signal controller may process the sensing output signal to generate contact information such as a contact occurrence, a contact position, etc.

When receiving the sensing input signal from the sensing signal controller, the first touch sensing electrode 410 is charged with a predetermined amount of charge, thereby forming a sensing capacitor with the adjacent first touch sensing electrode 410. When the contact occurs by an external object, the amount of charge of the sensing capacitor changes, and thus a corresponding sensing output signal can be transmitted to sense the surface touch.

An overcoat 390 may be disposed on the first touch sensing electrode 410 and the injection hole 307.

The overcoat 390 is disposed to cover the injection hole 307 through which the microcavity 305 is partially exposed. That is, the overcoat 390 may seal the microcavity 305 such that the liquid crystal molecules 310 disposed inside the microcavity 305 do not leak. The overcoat 390 may be formed of a material that does not react with the liquid crystal molecules 310 that it contacts. For example, the overcoat 390 may be formed of parylene and the like.

The overcoat 390 may be formed of a multilayer such as a double layer, a triple layer, etc. The double layer may be formed of two layers that are formed of different materials. The triple layer consists of three layers, respectively including materials different from adjacent layers. For example, the overcoat 390 may include a layer formed of an organic insulating material and a layer formed of an inorganic insulating material.

A second touch sensing electrode 420 may be disposed on the overcoat 390. Accordingly, the second touch sensing electrode 420 may be arranged in the column direction along in which the microcavity 305 is disposed. In other words, the second touch sensing electrode 420 is disposed in each pixel PX and the first valley V1 along the pixel column, but is not disposed in the second valley V2. The second touch sensing electrode 420 may be formed of at least one of a silver nanowire (AgNW), ITO, IZO, CNT, graphene, a metal mesh, and a conductive polymer.

The second touch sensing electrode 420 receives the sensing input signal from the sensing signal controller (not shown) and transmits the sensing output signal. The sensing signal controller may process the sensing output signal to generate contact information such as a contact occurrence, a contact position, etc.

When receiving the sensing input signal from the sensing signal controller, the second touch sensing electrode 420 is charged with a predetermined amount of charge, thereby forming a sensing capacitor with the adjacent first touch sensing electrode 410. When the contact occurs by an external object, the amount of charge of the sensing capacitor changes, and thus the corresponding sensing output signal can be transmitted to sense the surface touch.

An upper insulating layer 380 may be disposed on the second touch sensing electrode 420 and the overcoat 390. The upper insulating layer 380 may be formed of an inorganic insulating material including at least one of a silicon nitride ($SiN_x$), a silicon oxide ($SiO_x$), etc.

A polarizers (not shown) may be further disposed on top and bottom surfaces of the display device. The polarizers may include a first polarizer (not shown) and a second polarizer (not shown). The first polarizer may be attached to a bottom surface of the substrate 110, and the second polarizer may be attached on top of the upper insulating layer 380.

A manufacturing method of a display device according to one or more exemplary embodiments will be described with reference to FIGS. 5, 6, 7, 8, 9, 10, 11, and 12. The manufacturing method will be described with further reference to FIGS. 1, 2, 3, and 4 as well.

FIGS. 5, 6, 7, 8, 9, 10, 11, and 12 are cross-sectional views sequentially showing the manufacturing method of the display device according to one or more exemplary embodiments.

Figure 5:
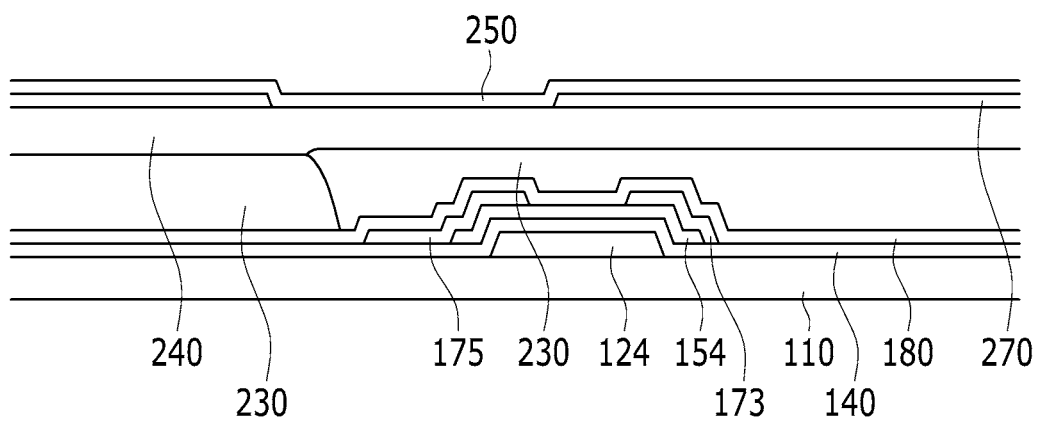
FIGS. 5, 6, 7, 8, 9, 10, 11, and 12 are cross-sectional views sequentially showing a manufacturing method of a display device according to one or more exemplary embodiments.
Figure 6:
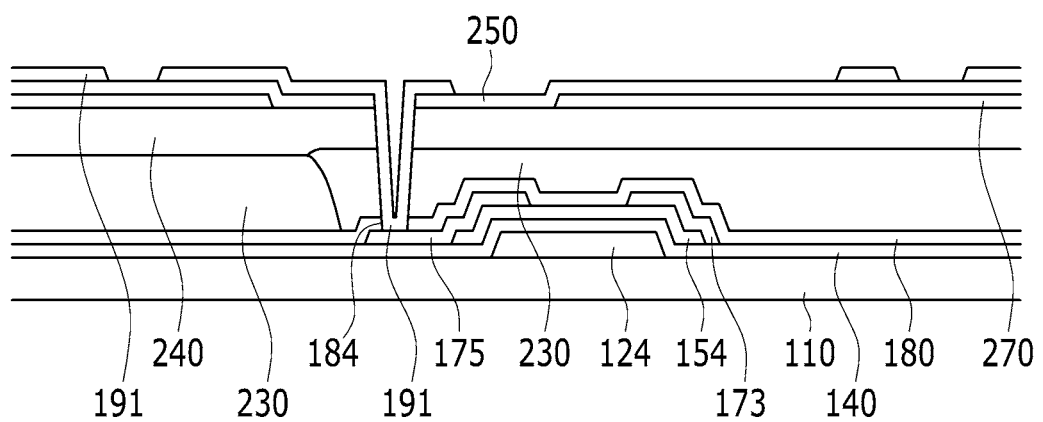

Referring first to FIGS. 5 and 6, the gate line 121 including the gate electrode 124 is disposed on the substrate 110, and the gate insulating layer 140 is formed on the gate line 121. The semiconductor 154, the data line 171 including the source electrode 173, and the drain electrode 175 are disposed on the gate insulating layer 140. The passivation layer 180 is formed on the data line 171 and the drain electrode 175.

The color filter 230 is disposed in each pixel area (or each pixel) PX on the passivation layer 180. Each color filter 230 may be disposed in each pixel area PX and may not be disposed in the first valley V1. The color filters 230 of the same color may be disposed along a column direction of the plurality of pixel areas PX. When each of the color filters 230 represent one of three colors, a mask may be used to dispose the color filter 230 of a first color first and then a mask be shifted and used to disposed the color filter 230 of a second color. After the color filter 230 of the second color is disposed, the mask may be shifted and used to form the color filter 230 of a third color.

The organic layer 240 and the common electrode 270 are disposed on the color filter 230, and the insulating layer 250 is disposed on the common electrode 270 using an inorganic insulating material including at least one of a silicon nitride ($SiN_x$), a silicon oxide ($SiO_x$), etc.

The passivation layer 180, the color filter 230, and the insulating layer 250 are etched to form a contact hole 184, partially exposing the drain electrode 175.

A transparent metallic material including at least one of indium tin oxide (ITO), indium zinc oxide (IZO), etc. is disposed and patterned to form a pixel electrode 191 in the pixel area PX. The pixel electrode 191 is disposed contacting the drain electrode 175 through the contact hole 184.

Figure 7:
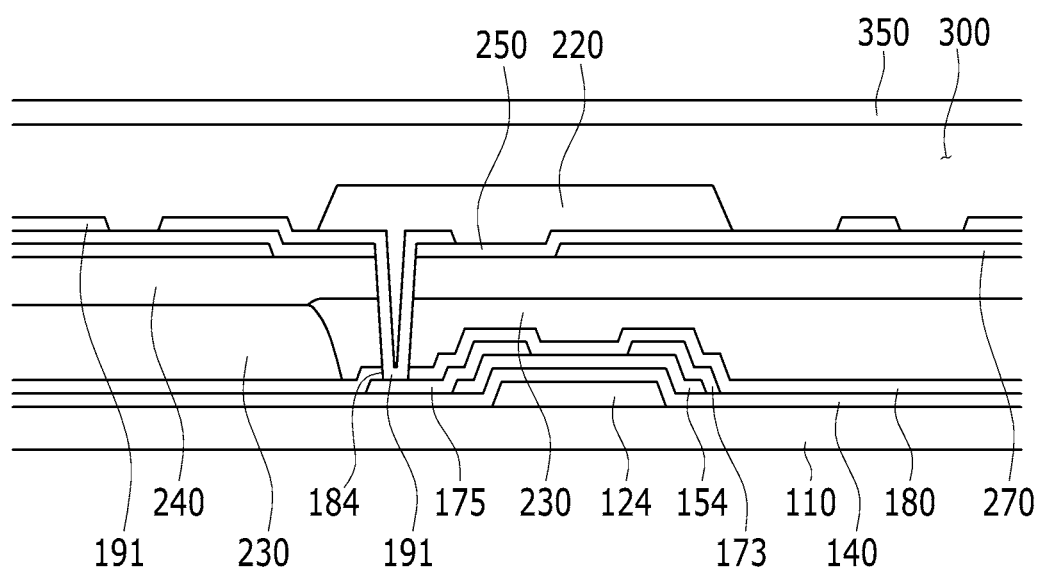

Referring to FIG. 7, a light blocking member 220 is disposed on the pixel electrode 191, the insulating layer 250, a boundary of each pixel area PX, and a thin film transistor. In other words, the light blocking member 220 may be disposed in the first valley V1. The light blocking member 220 may be disposed at one edge of each pixel area PX.

The above exemplary embodiments illustrates the light blocking member 220 is disposed after the color filter 230 is formed, but the exemplary embodiments are not limited thereto. The color filter 230 may be disposed after the light blocking member 220 is disposed.

The photosensitive organic material (not shown) is coated on the pixel electrode 191, and a sacrificial layer 300 is disposed by a photo process.

The sacrificial layer 300 is continuously formed along the column direction. In other words, the sacrificial layer 300 is disposed to cover each pixel area PX, and the photosensitive organic material disposed on the second valley V2 may be removed.

The lower insulating layer 350 may be disposed on the sacrificial layer 300 using an inorganic insulating material such as a silicon oxide or a silicon nitride.

Figure 8:
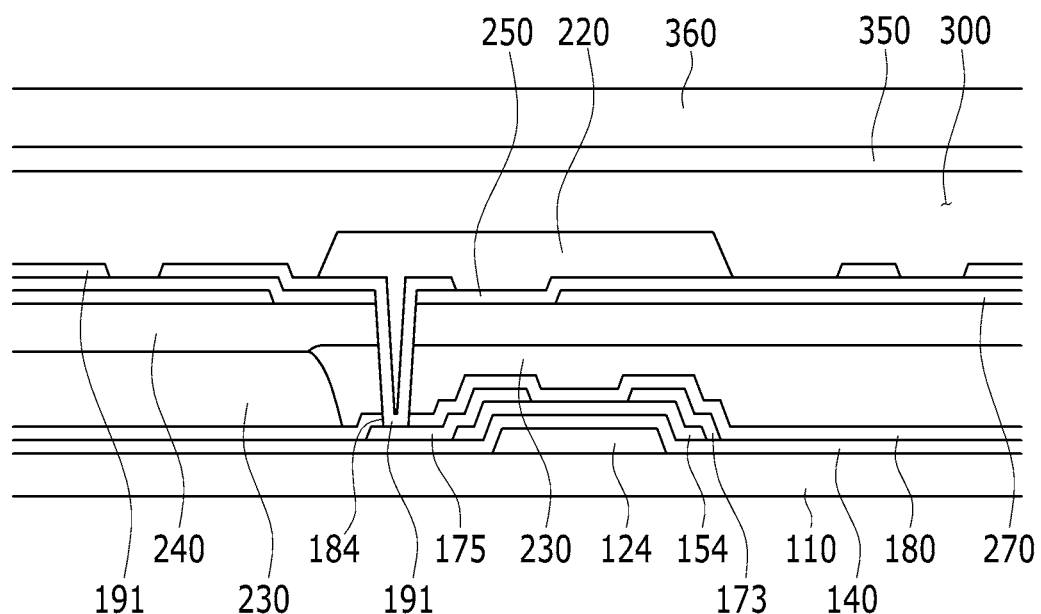

Referring to FIG. 8, the roof layer 360 is disposed on the lower insulating layer 350 using an organic material.

Figure 9:
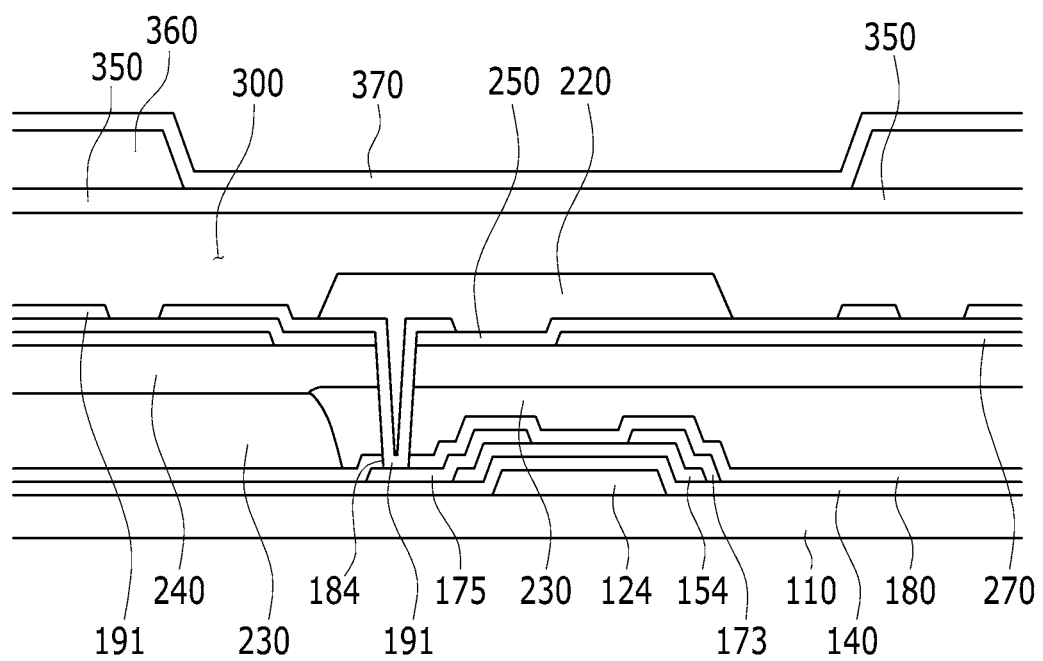

Referring to FIG. 9, the roof layer 360 disposed on the lower insulating layer 350 may be patterned by removing the roof layer 360 disposed on the first valley V1, such that the roof layer 360 is continuously disposed along a plurality of pixel rows.

An intermediate insulating layer 370 may be disposed on the roof layer 360 using an inorganic insulating material including at least one of a silicon nitride ($SiN_x$), a silicon oxide ($SiO_x$), etc. The intermediate insulating layer 370 may be disposed on the patterned roof layer 360, and protect a lateral side of the roof layer 360.

Figure 10:
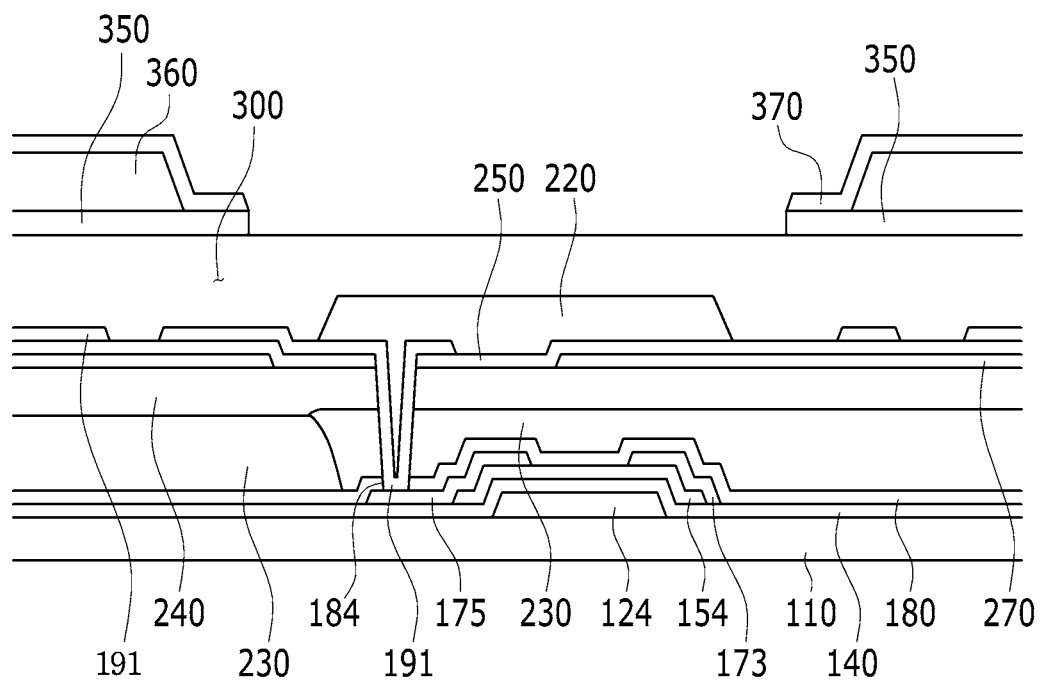

Referring to FIG. 10, the intermediate insulating layer 370 and the lower insulating layer 350 are patterned by removing the intermediate insulating layer 370 and the lower insulating layer 350 disposed in the first valley V1. Accordingly, the sacrificial layer 300 disposed at the first valley V1 is exposed.

Figure 11:
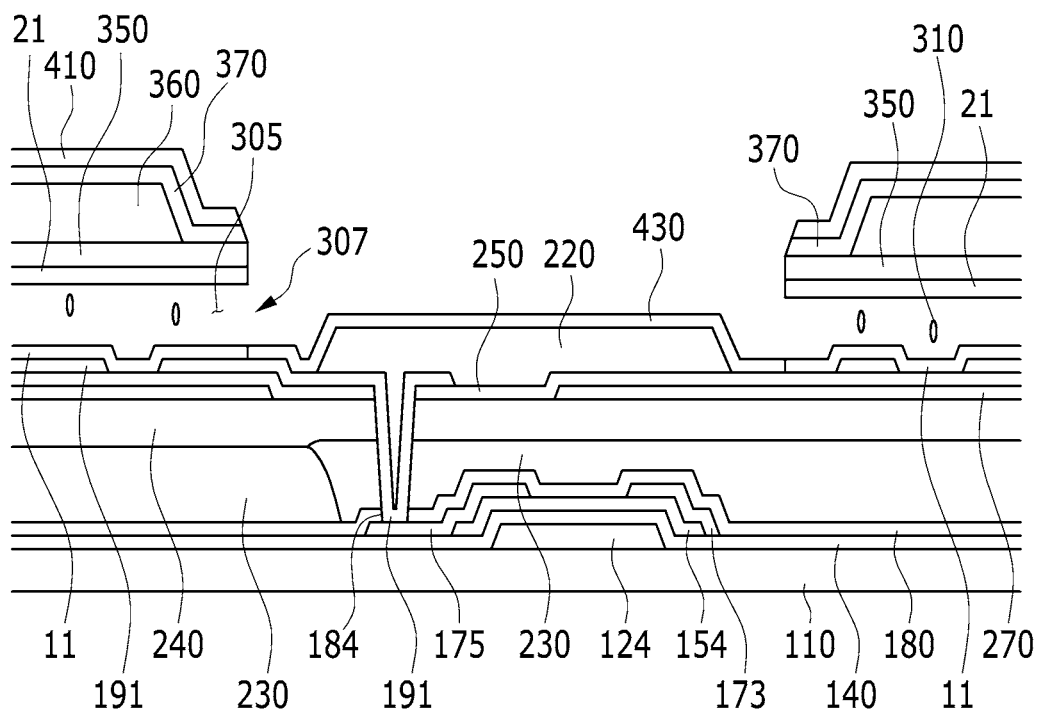
Figure 12:
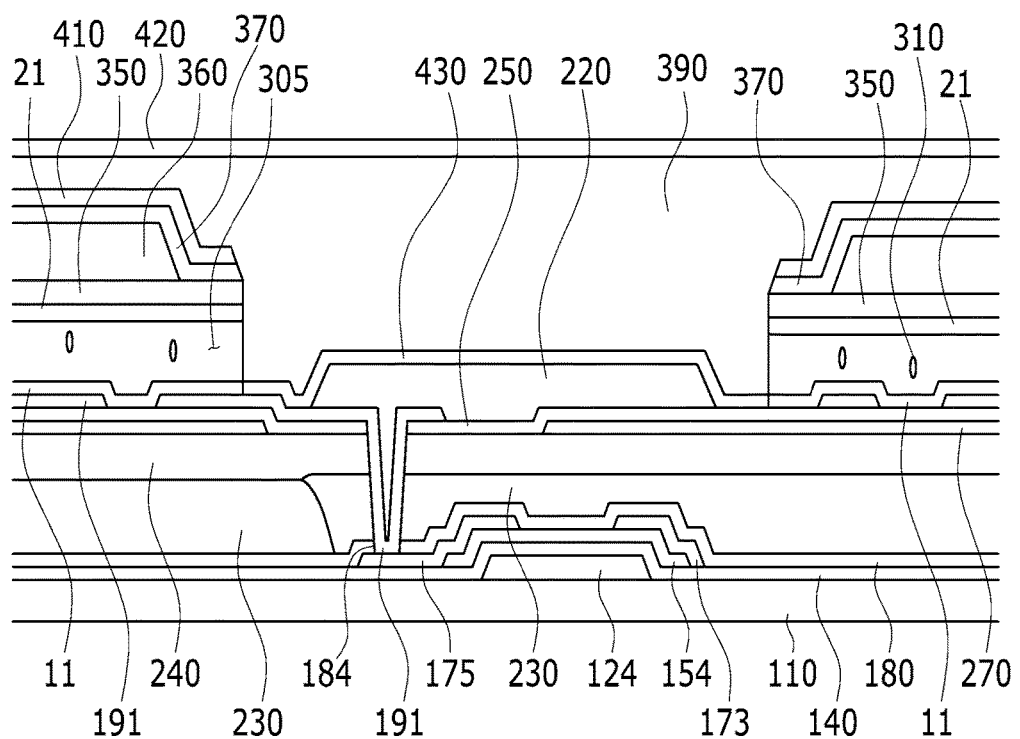

Referring to FIG. 11, the sacrificial layer 300 is fully removed by a developing process of applying a developer solution onto the exposed sacrificial layer 300, or by an ashing process. Accordingly, the sacrificial layer 300 is removed, and the microcavity 305 is formed at a location where the sacrificial layer 300 was previously disposed.

The pixel electrode 191 and the roof layer 360 are separated from each other with the microcavity 305 interposed therebetween. The roof layer 360 is disposed to cover top and side edges of the microcavity 305.

The microcavity 305 is exposed through a portion where the roof layer 360 is removed, which is referred to as the injection hole 307. The injection hole 307 is disposed along the first valley V1.

The substrate 110 is heated to harden the roof layer 360. The hardened roof layer 360 may maintain the original shape of the microcavity 305.

An aligning agent including an aligning material is applied onto the substrate 110 using a spin coating or Inkjet method, and the aligning agent is injected into the microcavity 305 through the injection hole 307. The hardening process of the roof layer 360 may be performed after injecting the aligning agent into the microcavity 305, and a solution solvent evaporates, and the alignment material remains on a wall surface inside the microcavity 305 to form the first alignment layer 11 and the second alignment layer 21.

Thus, the first alignment layer 11 may be disposed on the pixel electrode 191, and the second alignment layer 21 may be disposed under the lower insulating layer 350. The first alignment layer 11 and the second alignment layer 21 are disposed facing each other with the microcavity 305 interposed therebetween. The first and second alignment layers 11 and 21 may be coupled to each other at the side edges of the pixel area PX.

The first and second alignment layers 11 and 21 may be aligned in a vertical direction with respect to the substrate 110 except for the lateral sides of the microcavity 305. A process of irradiating UV rays to the first and second alignment layers 11 and 21 may also be performed to align the first and second alignment layers 11 and 21 in a direction parallel to the substrate 110.

The first touch sensing electrode 410 and the auxiliary electrode 430 may be integrally disposed on the whole region of the pixel PX, the first valley V1, and the second valley V2 using at least one of a silver nanowire (AgNW), ITO, IZO, carbon nanotubes (CNT), graphene, a metal mesh, and a conductive polymer.

The first touch sensing electrode 410 may be disposed on the intermediate insulating layer 370, and the auxiliary electrode 430 may be disposed in the first valley V1 where the injection hole 307 is formed. In other words, the first touch sensing electrode 410 is not disposed in the first valley V1, but is disposed in each pixel PX and the second valley V2 along a pixel row, and the auxiliary electrodes 430 may be formed in the first valley V1 between the adjacent first touch sensing electrodes 410 formed along pixel rows.

The auxiliary electrodes 430 may be integrally formed of the same material as the first touch sensing electrode 410, and the auxiliary electrodes 430 may reduce or prevent display abnormalities such as abnormal movement of liquid crystals caused by the static electricity that may occur inside and outside the display device.

The overcoat 390 may be formed by depositing a material that does not react with the liquid crystal molecules 310 onto the first touch sensing electrode 410 and the auxiliary electrode 430. The overcoat 390 is disposed to cover the injection hole 307 where the microcavity 305 is exposed and seal the microcavity 305.

A second touch sensing electrode 420 is disposed on the overcoat 390 using at least one of a silver nanowire (AgNW), ITO, IZO, CNT, graphene, a metal mesh, and a conductive polymer.

In the display device according to one or more exemplary embodiments, the second touch sensing electrode 420 may be arranged in the column direction along which the microcavity 305 is disposed. In other words, the second touch sensing electrode 420 is disposed in each pixel area PX and the first valley V1 along the pixel column, and is not disposed in the second valley V2.

An upper insulating layer 380 is disposed on the second touch sensing electrode 420 and the overcoat 390 where the second touch sensing electrode 420 is not formed, using an inorganic insulating material including at least one of a silicon nitride ($SiN_x$), a silicon oxide ($SiO_x$), etc.

The polarizers (not shown) may be attached to top and bottom surfaces of the display device. The polarizers may include a first polarizer (not shown) and a second polarizer (not shown). The first polarizer may be attached to a bottom surface of the substrate 110, and the second polarizer may be attached on top of the upper insulating layer 380.

According to the exemplary embodiments, the display device can be manufactured using the single substrate, and thereby reducing weight, thickness, and cost of the display device as well as simplifying the structure of the display device and the manufacturing process thereof, by forming the touch electrode on the top surface of the display device. According to the exemplary embodiments, the auxiliary electrode may be integrally formed simultaneous with the touch electrode, and the generation of static electricity in the display device may be reduced or prevented while simplifying the structure thereof. Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
   a substrate comprising at least one of pixel;
   a thin film transistor disposed on the substrate;
   a common electrode disposed on the thin film transistor;
   a pixel electrode disposed on the common electrode overlapping the common electrode;
   an insulating layer interposed between the common electrode and the pixel electrode;
   at least one roof layer disposed spaced apart from the common electrode and the pixel electrode to form a microcavity therebetween, the microcavity comprising an injection hole;
   a liquid crystal layer disposed in the microcavity;
   at least two adjacent first touch sensing electrodes disposed on the at least one roof layer;
   an auxiliary electrode disposed between the two adjacent first touch sensing electrodes;
   an overcoat disposed to cover the first touch sensing electrodes and the injection hole, the overcoat sealing the microcavity; and
   a second touch sensing electrode disposed on the overcoat.

2. The display device of claim 1, further comprising:
   a first valley disposed in a row direction; and
   a second valley disposed in a column direction,
   wherein the first valley and the second valley divide pixels in the row and column directions, respectively, and
   wherein the injection hole is disposed toward the first valley.

3. The display device of claim 2, wherein
   the first touch sensing electrode is disposed in each pixel and the second valley along columns of the pixels, and
   the second touch sensing electrode is disposed in each pixel and the first valley along rows of the pixels.

4. The display device of claim 3, wherein the auxiliary electrode is disposed in the first valley, the auxiliary disposed parallel to the first touch sensing electrode.

5. The display device of claim 4, wherein the first and second touch sensing electrodes are formed of one or more material selected from a group consisting of a silver nanowire (AgNW), ITO, IZO, carbon nanotubes (CNT), graphene, a metal mesh, and a conductive polymer.

6. The display device of claim 5, wherein the first touch sensing electrode and the auxiliary electrode are made of the same material.

7. The display device of claim 3, further comprising:
   a lower insulating layer disposed on a bottom surface of the roof layer;
   an intermediate insulating layer disposed on a top surface of the roof layer; and
   an upper insulating layer disposed on the second touch sensing electrode and the overcoat.

8. The display device of claim 7, wherein the lower insulating layer, the intermediate insulating layer, and the upper insulating layer are formed of one or more materials selected a group consisting of a silicon nitride ($SiN_x$), a silicon oxide ($SiO_x$), and a silicon oxynitride ($SiO_xN_y$).

9. A manufacturing method of a display device, comprising:

disposing a thin film transistor on a substrate;
disposing a common electrode on the thin film transistor;
disposing an insulating layer on the common electrode;
disposing a pixel electrode overlapping the common electrode, the pixel electrode connected to the thin film transistor;
disposing a sacrificial layer on the pixel electrode;
forming a roof layer comprising:
  coating an organic material on the sacrificial layer; and
  patterning the organic material to expose the sacrificial layer through the patterned roof layer;
removing the exposed sacrificial layer to form a microcavity and an injection hole between the roof layer and the pixel electrode;
simultaneously disposing a first touch sensing electrode on the roof layer and an auxiliary electrode between the two adjacent first touch sensing electrodes;
injecting a liquid crystal material into the microcavity through the injection hole;
sealing the microcavity by forming an overcoat on the first touch sensing electrode and the auxiliary electrode; and
forming a second touch sensing electrode on the overcoat.

10. The manufacturing method of claim 9, further comprising:
forming a first valley disposed in a row direction; and
forming a second valley disposed in a column direction,
wherein the first valley and the second valley divide the pixels in the row and column directions, respectively, and
wherein each of the microcavity forms each of the pixels.

11. The manufacturing method of claim 10, wherein
the first touch sensing electrode is disposed in each pixel and the second valley along columns of the pixels, and
the second touch sensing electrode is disposed in each pixel and the first valley along rows of the pixels.

12. The manufacturing method of claim 11, wherein the auxiliary electrode is disposed in the first valley, the auxiliary disposed parallel to the first touch sensing electrode.

13. The manufacturing method of claim 12, wherein the first and second touch sensing electrodes are formed of one or more materials selected from a group consisting of a silver nanowire (AgNW), ITO, IZO, carbon nanotubes (CNT), graphene, a metal mesh, and a conductive polymer.

14. The manufacturing method of claim 13, wherein
the first touch sensing electrode and the auxiliary electrode are made of a same material.

15. The manufacturing method of claim 10, further comprising:
disposing a lower insulating layer on the sacrificial layer before forming the roof layer;
disposing an intermediate insulating layer on the roof layer after forming the roof layer; and
disposing an upper insulating layer on the second touch sensing electrode and the overcoat.

16. The manufacturing method of claim 15, wherein the lower insulating layer, the intermediate insulating layer, and the upper insulating layer are formed of one or more materials selected a group consisting of a silicon nitride ($SiN_X$), a silicon oxide ($SiO_X$), and a silicon oxynitride ($SiO_XN_Y$).

* * * * *